United States Patent [19]
Strittmatter et al.

[11] Patent Number: 4,988,175
[45] Date of Patent: Jan. 29, 1991

[54] OPTICAL MAGNIFYING SYSTEM

[75] Inventors: Donald J. Strittmatter; David R. Wickholm, both of Tucson, Ariz.

[73] Assignee: Hughes Aircraft Company, Los Angeles, Calif.

[21] Appl. No.: 432,706

[22] Filed: Nov. 7, 1989

[51] Int. Cl.⁵ .......................... G02B 9/34; G02B 9/12; G02B 5/20

[52] U.S. Cl. .................................... 350/469; 350/410

[58] Field of Search ................ 350/469, 439, 410, 477

[56] References Cited

U.S. PATENT DOCUMENTS 4,768,866  9/1988  Wickholm et al. ................. 350/410
4,792,214  12/1988  Wickholm et al. ................. 350/410

FOREIGN PATENT DOCUMENTS 0057019  5/1981  Japan ................................... 350/410

*Primary Examiner*—Bruce Y. Arnold
*Assistant Examiner*—Rebecca D. Gass
*Attorney, Agent, or Firm*—R. A. Hays; R. M. Heald; W. Denson-Low

[57] ABSTRACT

Optical systems with very long eye relief and large working distances (10) and (110) with four lenses (12), (14), (16), (18) and (20) and three lenses (112), (114) and (116), respectively, have lens surfaces shaped to focus upon an object such that a high resolution image is formed at infinity substantially over the entire field of view. High resolution and low distortion are substantially maintained independent of the user's eye location.

16 Claims, 1 Drawing Sheet

OPTICAL MAGNIFYING SYSTEM

BACKGROUND OF THE INVENTION

1. Field of the Invention

The present invention relates to a wide field of view optical magnifying system and, more particularly, to a magnifier having a very long eye relief and large working distance.

2. Description of Related Art

Visual inspection tools are used in several industrial fields to inspect components for defects which cannot be seen with the naked eye. Many industries have stringent magnification specifications. In the soldering industry and especially in the aerospace circuit board industry, the solder connections must be inspected to meet desired specifications. Visual tools, such as magnifiers are used to increase the apparent size of the solder connection viewed. This increase in size better enables an inspector to see and determine whether or not the solder connection meets desired specifications. Other applications will become apparent which utilize magnifying devices for inspection where inspection with the naked eye is inadequate.

Prior magnifying optical systems exist in the field. These prior magnifiers generally have one or more lens elements and have several disadvantages. The prior magnifiers generally have a magnification power of less than what is specified on the magnifier. The magnifiers generally have a small usable field of view, which causes severe eye strain in just a short period of time. The viewing distance between the user's eye and the object is generally very short. This close viewing range causes the user to hold the viewed object in close proximity to his face increasing the likelihood of contamination. Generally, the prior magnifiers have distorted imagery as the view traverses from the center to the peripheries of the field of view. The prior magnifiers are somewhat heavy, have poor resolution, and have chromatic aberrations. Also, prior magnifiers generally limit the eye resolution to only along the axis of the magnifier. Thus, there is a need in the art to provide an optical magnifying system, having a wide field of view and which the operator can easily control during use.

Two solutions to the above problem are assignee's U.S. Pat. Nos. 4,768,866, entitled Optical Magnifying System: 4×Loupe issued Sept. 6, 1988 and 4,792,214, entitled Optical Magnifying System: 10×Loupe, issued Dec. 20, 1988, both of which specifications are herein incorporated by reference.

U.S. Pat. No. 4,768,866 illustrates an optical magnifying system including a primary lens defining an optical axis and positioned a larger than normal predetermined working distance adjacent to the object being viewed. A secondary lens, a tertiary and a quaternary lens are also centered with respect to the optical axis. The primary, secondary, tertiary and quaternary lenses have surfaces which are shaped to focus upon an object such that a high resolution image is formed at infinity at 4×magnification.

U.S. Pat. No. 4,792,214 illustrates an optical magnifying system which has high resolution over a large field of view. The invention includes lenses shaped to focus upon an object such that a high resolution image is formed at infinity at 10×magnification. Also, the invention provides the art with a six element eye loupe which limits distortion in the field of view, corrects chromatic aberrations, and provides true 10×magnification.

While the inventions of the above two references perform satisfactorily, the present invention provides still further improvements to the art.

SUMMARY OF THE INVENTION

Accordingly, the new and improved optical magnifying system of the present invention provides the art with an improved magnifier which has a large usable field of view, a very long eye relief distance and a large working distance. Also, the present invention provides the art with three and four element magnifiers which decrease distortion in the field of view and correct chromatic aberrations. The present invention further provides a high resolution low distortion image which is insensitive to lateral or axial eye position.

In one embodiment of the invention, the optical magnifying system employs a primary lens which is positioned a larger than normal predetermined working distance adjacent to the object being viewed, a secondary lens, a tertiary and a quaternary lens. The primary, secondary, tertiary, and quaternary lenses have surfaces which are shaped to focus upon an object such that a high resolution image is formed at infinity at a desired magnification while providing a long eye relief distance between the quaternary lens and the viewer.

The primary lens is generally a negative convex-concave lens. The secondary lens is generally a positive biconvex lens. An optical filter such as a plane parallel polarizing element may be used for glare reduction. The tertiary lens is generally a positive biconvex lens. The quaternary lens is generally a negative concave-convex lens.

The primary and secondary lenses and the tertiary and quaternary lenses are preferably coupled together to form a first and second doublet. The doublets are positioned with respect to one another such that the positive lenses are proximate to one another and separated by the optional filter. Generally, the first doublet is positioned such that the negative lens is at a predetermined working distance adjacent to the object being viewed and the negative lens of the second doublet is positioned at a predetermined distance adjacent to an aperture stop, such as the human eye.

In a second embodiment, the system employs three lenses instead of four. The primary lens is a positive concave-convex lens, the secondary lens is a biconvex lens and the tertiary lens is a negative concave-convex lens.

From the subsequent description and the appended claims taken in conjunction with the accompanied drawings, other objects and advantages of the present invention will become apparent to one skilled in the art.

DESCRIPTION OF THE PREFERRED EMBODIMENT

Figure 1:
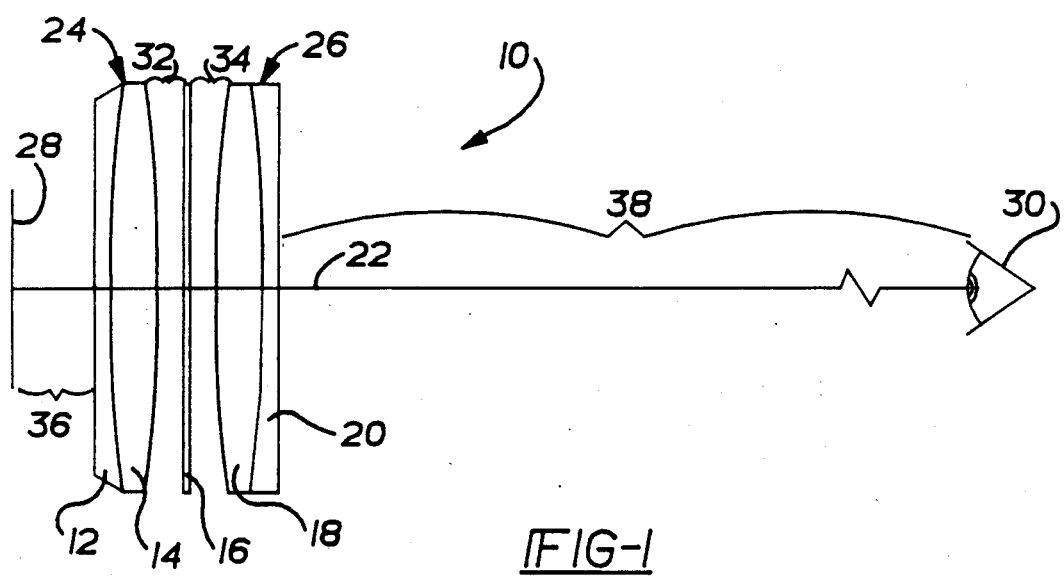
FIG. 1 is a schematic view of an optical magnifying system in accordance with the present invention.

Turning to FIG. 1, a four lens optical magnifying system is illustrated and designated with the reference numeral (10). The system (10) includes a primary lens (12), which is a negative lens, positioned adjacent to a secondary lens (14), which is a positive lens. The secondary lens (14) is positioned proximate to an optional filter (16) which, in turn, is positioned proximate to a tertiary lens (18), which is a positive lens. The tertiary lens (18) is positioned adjacent to a quaternary lens (20), which is a negative lens.

The primary lens (12) defines an optical axis (22), which runs through the vertex of the lens. Generally, the primary lens is a convex-concave lens formed from a high dispersion glass material. The primary lens (12) has a predetermined radius of curvature on the convex or front surface of the lens and a predetermined radius of curvature on the concave or back surface of the lens. Also, the primary lens (12) has a predetermined thickness at the vertex and predetermined aperture size on the convex front surface and the concave back surface.

The secondary lens (14) is centered with respect to the optical axis (22). Generally, the secondary lens (14) is a biconvex lens formed from a low dispersion glass material. Generally, the secondary lens (14) has a predetermined radius of curvature on the convex or front surface of the lens and a predetermined radius of curvature on the convex or back surface of the lens. The secondary lens (14) has a predetermined thickness at its vertex and predetermined aperture sizes on the convex front and convex back surfaces.

The optional filter (16) is centered with respect to the optical axis (22). Generally, the optional filter (16) is a plane parallel polarizing element which reduces glare from reflections off of the object (28) being viewed. Generally, the optional filter (16) has a predetermined thickness at its vertex and predetermined aperture sizes on both planar front and back surfaces.

The tertiary lens (18) is centered with respect to the optical axis (22). Generally, the tertiary lens (18) is a biconvex lens formed from a low dispersion glass material. Generally, the tertiary lens (18) has a predetermined radius of curvature on the convex or front surface of the lens and a predetermined radius of curvature on the convex or back surface. The tertiary lens (18) has a predetermined thickness at its vertex and predetermined aperture sizes on the convex front and convex back surfaces.

The quaternary lens (20) is centered with respect to the optical axis (22). Generally, the quaternary lens (20) is a concave-convex lens formed from a high dispersion glass material. Generally, the quaternary lens (20) has a predetermined radius of curvature on the concave or front surface and a predetermined radius of curvature on the convex or back surface. The quaternary lens (20) has a predetermined thickness at its vertex and predetermined aperture sizes on the concave front and convex back surfaces.

Generally, the primary and secondary lenses (12) and (14) and the tertiary and quaternary lenses (18) and (20) are adhered together, by conventional means, to form a first (24) and a second (26) doublet. The doublets (24) and (26) are oriented such that the positive secondary (14) and tertiary lenses (18) are positioned proximate to one another separated by the optional filter (16) in the optical system (10). The negative primary and quaternary lenses (12) and (20) are positioned such that the primary lens (12) is at a predetermined distance adjacent to the object (28) being viewed and the quaternary lens (20) is positioned at a predetermined distance adjacent to an aperture stop (30). The aperture stop (30) may be an electronic sensor or the like. However, normally the aperture stop (30) is the human eye.

Spaces (32) and (34) are formed between the first and second doublets (24) and (26) and the optional filter (16). The spaces (32) and (34) have a predetermined length measurement between the doublets (24) and (26) and the optional filter (16). The length of the spaces (32) and (34) along with the curvatures, thicknesses and glass types of the elements (12), (14), (16), (18) and (20) enable the system (10) to perform as a true magnifier at a desired magnification power.

The effective focal length of system (10) is of a predetermined length. Generally, magnification power is determined by dividing the effective focal length (in inches) into 10 inches. In the present invention, the working distance (36), which is a predetermined distance between the object (28) and the primary lens (12), exceeds 85% of the effective focal length of the system (10). Generally, the distance (38) from the aperture stop (30), or the user's eye to the quaternary lens (18) is of a predetermined distance of from about 0 to about 24 inches providing a very long eye relief distance for the viewer. These two distances (36) and (38), along with the lens thickness and spacing, enable the system (10) to achieve a total object to eye distance greater than 10 times the effective focal length of the system. The lens glass enhances correction of axial and lateral chromatic aberrations. The lens radii minimize image blur and maintain low distortion over the large diameter object field of view. The present invention displays high resolution from the center of the field of view out to the edge of the field of view, up to a 1.0 inch diameter for eye distances from 4 inches to 12 inches. The invention has been designed such that high resolution and low distortion are maintained even when the user's eye is displaced axially or laterally from the nominal eye point on the optical axis. The resolution of the device is limited only by the resolution of the user's eye near the center of the field of view. When electronic sensors are used with the system, similar high performance will result.

A specific prescription for a 4×magnifier having a four element configuration and a wide field of view is given in the following table:

TABLE 1

| | | Optical Prescription | | |
|---|---|---|---|---|
| Element Number | Glass Type | Radius of Curvature Front/Back | Distance/ Thickness | Aperture Diameter Front/Back |
| (36) Working Distance | | | 2.2125 | |
| (12) Primary Lens | SF57 Schott | 20.4489CX/3.0805CC | 0.0700 | 1.7600/1.7600 |
| (14) Secondary Lens | BAF13 Schott | 3.0805CX/−3.0805CX | 0.3400 | 1.7600/1.7600 |
| (32) Space | | | 0.0420 | |
| (16) Optional Filter | BK7 Schott | INF/INF | 0.0150 | 1.7600/1.7600 |
| (34) Space | | | 0.0420 | |
| (18) Tertiary Lens | BAF13 Schott | 3.0805CX/−3.0805CX | 0.3400 | 1.7600/1.7600 |
| (20) Quaternary Lens | SF57 Schott | −3.0805CC/−20.4489CX | 0.0700 | 1.7600/1.7600 |
| (38) Aperture Stop Distance | | | 4.000 to 12.000 | |

TABLE 1-continued

| | | Optical Prescription | | |
|---|---|---|---|---|
| Element Number | Glass Type | Radius of Curvature Front/Back | Distance/ Thickness | Aperture Diameter Front/Back |
| (30) Aperture Stop | | | | 0.2000 |

NOTES
Positive radius indicates the center of curvature is to the right
Negative radius indicates the center of curvature is to the left
Dimensions are given in inches
Thickness is axial distance to next surface
REFERENCE WAVELENGTH = 589.0 NM SPECTRAL RANGE = 486.0–656.0 NM It should be noted that the above prescription is an example for illustrative purposes and should not be constructed in any way to limit the present invention.

Figure 2:
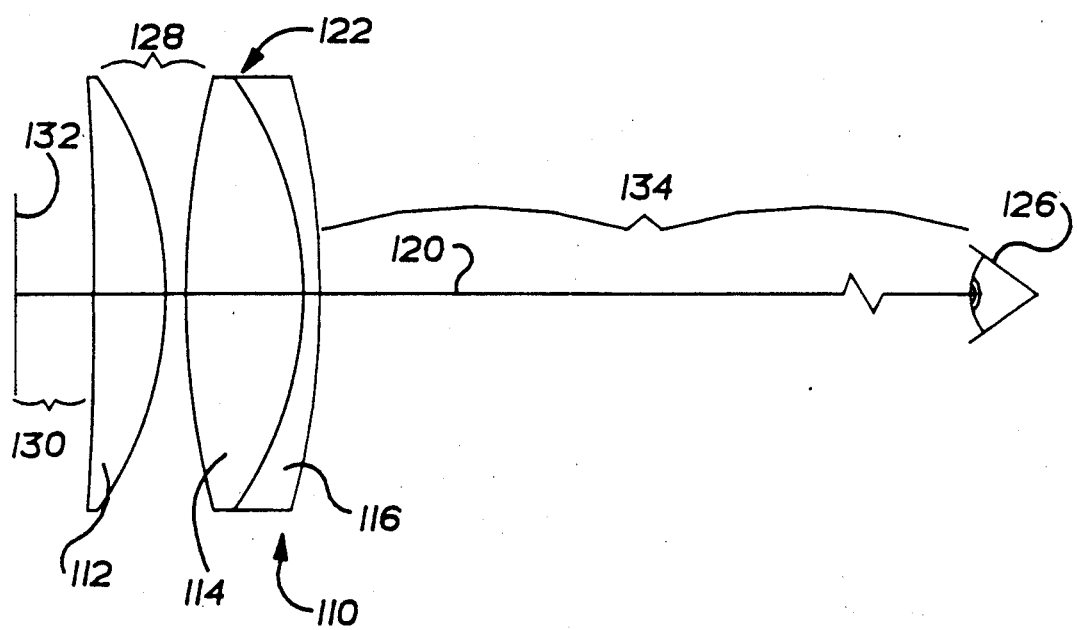
FIG. 2 is a schematic view of another optical magnifying system in accordance with the present invention.

Turning to FIG. 2, a three lens optical magnifying system is illustrated and designated with the reference numeral (110). The system (110) includes a primary lens (112), which is a positive lens, positioned proximate to a secondary lens (114), which is a positive lens. The secondary lens (114) is positioned adjacent to a tertiary lens (116), which is a negative lens.

The primary lens (112) defines an optical axis (120), which runs through the vertex of the lens. Generally, the primary lens is a concave-convex lens formed from a low dispersion glass material. The primary lens (112) has a predetermined radius of curvature on the concave or front surface of the lens and a predetermined radius of curvature on the convex or back surface of the lens. Also, the primary lens (112) has a predetermined thickness at the vertex and predetermined aperture size on the concave front surface and the convex back surface.

The secondary lens (114) is centered with respect to the optical axis (120). Generally, the secondary lens (114) is a biconvex lens formed from a low dispersion glass material. Generally, the secondary lens (114) has a predetermined radius of curvature on the convex or front surface of the lens and a predetermined radius of curvature on the convex or back surface of the lens. The secondary lens (114) has a predetermined thickness at its vertex and predetermined aperture sizes on the convex front and convex back surfaces The tertiary lens (116) is centered with respect to the optical axis (120). Generally, the tertiary lens (116) is a concave-convex lens formed from a high dispersion glass material. Generally, the tertiary lens (116) has a predetermined radius of curvature on the concave or front surface and a predetermined radius of curvature on the convex or back surface. Generally, the tertiary lens (116) has a predetermined thickness at its vertex and predetermined aperture sizes on the concave front and convex back surfaces.

Generally, the secondary (114) and the tertiary (116) lenses are adhered together, by conventional means, to form a doublet (122). The doublet (122) is oriented such that the positive secondary lens (114) is positioned proximate to the primary lens (112) in the optical system (110). The positive primary and negative tertiary lenses (112) and (116) are positioned such that the primary lens (112) is at a predetermined distance adjacent to the object (132) being viewed and the tertiary lens (116) is positioned at a predetermined distance adjacent to an aperture stop (126). The aperture stop (126) may be an electronic sensor or the like, however, normally the aperture stop (126) is the human eye.

A space (128) is formed between the primary lens (112) and doublet (122). The space (128) has a predetermined length measurement between the lens (112) and the doublet (122). The length of the space (128) along with the curvatures, thicknesses and glass types of the lenses (112), (114) and (116) enable the system (110) to perform as a true magnifier at a desired magnification power.

The effective focal length of system (110) is of a predetermined length. Generally, magnification power is determined by dividing the effective focal length (in inches) into 10 inches. In the present invention, the working distance (130), which is a predetermined distance between the object (132) and the primary lens (112), exceeds 75% of the effective focal length of the system (110). Generally, the distance (134) from the aperture 24 inches providing a very long eye relief distance for a viewer. These two distances (130) and (134), along with the lens thickness and spacing, enable the system (110) to achieve a total object to eye distance greater than 10 times the effective focal length of the system. The lens glasses enhance correction of axial and lateral chromatic aberrations. The lens radii minimize image blur as well as maintaining low distortion over the large diameter object field of view. The present invention displays high resolution from the center of the field of view out to the edge of the field of view, up to a full 1.0 inch diameter for eye distances of 6.4 inches to 16.0 inches. The device has been designed such that high resolution and low distortion are maintained even when the user's eye is displaced axially or laterally from the nominal eye point on the optical axis. The resolution of the device is limited only by the resolution of the user's eye near the center of the field of view. When electronic sensors are used with the system, similar high performance will result.

A specific prescription for a 4×magnifier having a three element configuration and a wide field of view is given in the following table:

TABLE 2

| | | Optical Prescription | | |
|---|---|---|---|---|
| Element Number | Glass Type | Radius of Curvature Front/Back | Distance/ Thickness | Aperture Diameter Front/Back |
| (130) Working Distance | | | 1.9340 | |
| (112) Primary Lens | LAK21 Schott | −20.000CC/−2.1259CX | 0.7000 | 2.9000/3.0000 |
| (128) Space | | | 0.0200 | |
| (114) Secondary Lens | BAK1 Schott | 5.9541CX/−2.0567CX | 1.1000 | 3.1500/3.1500 |
| (116) Tertiary Lens | SF57 Schott | −2.0567CC/−4.7613CX | 0.1400 | 3.1500/3.1500 |
| (134) Aperture Stop Distance | | | 6.4000 to 16.000 | |

TABLE 2-continued

| | | Optical Prescription | | |
|---|---|---|---|---|
| Element Number | Glass Type | Radius of Curvature Front/Back | Distance/ Thickness | Aperture Diameter Front/Back |
| (126) Aperture Stop | | | 0.2000 | |

NOTES
Positive radius indicates the center of curvature is to the right
Negative radius indicates the center of curvature is to the left
Dimensions are given in inches
Thickness is axial distance to next surface
REFERENCE WAVELENGTH = 589.0 NM SPECTRAL REGION = 486.0–656.0 NM It should be noted that the above prescription is an example for illustrative purposes and should not be constructed in any way to limit the present invention.

Advantages provided by the examples of the preferred embodiment of this invention include the lightweight compact size, and a high resolution true magnification over a field of view which is enlarged over that of existing magnifiers. Performance of the device is not sensitive to eye position. Also, the distance between the viewer and the object and the object and magnifier are substantially increased, permitting additional ease of use.

Specific utility with the three and four element magnifiers of this invention includes the inspecting of solder connections in varying industries, particularly, the inspection of solder connections on circuit boards and the like where naked eye visualization cannot detect the imperfections in the solder connections. The optical systems may be easily fitted into a housing having an arbitrary shape and adapted to be hand held or mounted in an illumination fixture on an articulating arm if the user's hands must be free.

While it will be apparent that the preferred embodiment is well calculated to fill the above stated objects, it will also be appreciated that the present invention is susceptible to modification, variation, alteration, and change without varying from the proper scope and fair meaning of the subjoined claims.

What is claimed is:

1. An optical magnifying system comprising:
  a primary lens, said primary lens being a negative convex-concave lens defining an optical axis, said primary lens being disposed a predetermined working distance from the object being viewed;
  a secondary lens, said secondary lens being a positive biconvex lens disposed adjacent said primary lens and centered with respect to said optical axis;
  a tertiary lens, said tertiary lens being a positive biconvex lens disposed proximate said secondary lens and centered with respect to said optical axis;
  a filter, said filter being a plane parallel polarizing element which may be a glare reducing element disposed proximate said secondary and tertiary lenses and centered with respect to said optical axis; and
  a quaternary lens, said quaternary lens being a negative concave-convex lens disposed adjacent said tertiary lens and centered with respect to said optical axis, said quaternary lens being disposed with respect to said secondary lens such that said tertiary lens is disposed therebetween, said lenses focusing upon said object such that an image is formed at infinity.

2. The optical magnifying system according to claim 1 further comprising an eye relief distance from the quaternary lens to a viewer of from about 0 to about 24 inches.

3. The optical magnifying system according to claim 1 wherein said primary and quaternary lenses are high dispersion glass lenses and said secondary and tertiary lenses are low dispersion glass lenses.

4. The optical magnifying system of claim 1, wherein said system forms a high resolution image substantially over the entire field of view of the system.

5. The optical magnifying system according to claim 1 wherein said primary and secondary lenses form a first doublet having one positive lens and the other a negative lens, and said tertiary and quaternary lenses form a second doublet, having one positive lens and the other a negative lens.

6. The optical magnifying system according to claim 5 wherein said doublets are positioned such that said positive lenses are adjacent to one another.

7. The optical magnifying system according to claim 6 wherein a filter is positioned between said positive lenses.

8. The optical magnifying system according to claim 1 wherein said system conforms substantially to the following table in which all elements have the characteristic values shown, proceeding from the object to the viewer:

| Element Number | Glass Type | Radius of Curvature Front/Back | Distance/ Thickness | Aperture Diameter Front/Back |
|---|---|---|---|---|
| (36) Working Distance | | | 2.2125 | |
| (12) Primary Lens | SF57 Schott | 20.4489CX/3.0805CC | 0.0700 | 1.7600/1.7600 |
| (14) Secondary Lens | BAF13 Schott | 3.0805CX/−3.0805CX | 0.3400 | 1.7600/1.7600 |
| (32) Space | | | 0.0420 | |
| (16) Filter | BK7 Schott | INF/INF | 0.0150 | 1.7600/1.7600 |
| (34) Space | | | 0.0420 | |
| (18) Tertiary Lens | BAF13 Schott | 3.0805CX/−3.0805CX | 0.3400 | 1.7600/1.7600 |
| (20) Quaternary Lens | SF57 Schott | −3.0805CC/−20.4489CX | 0.0700 | 1.7600/1.7600 |
| (38) Aperture Stop Distance | | | 4.000 to 12.000 | |

-continued

| Element Number | Glass Type | Radius of Curvature Front/Back | Distance/ Thickness | Aperture Diameter Front/Back |
|---|---|---|---|---|
| (30) Aperture Stop | | | | 0.2000 |

NOTES
Positive radius indicates the center of curvature is to the right
Negative radius indicates the center of curvature is to the left
Dimensions are given in inches
Thickness is axial distance to next surface
REFERENCE WAVELENGTH = 589.0 NM SPECTRAL RANGE = 486.0–656.0 NM 9. An optical magnifying system comprising:
a primary lens, said primarY lens being a positive concave-convex lens defining an optical axis, said primary lens being disposed a predetermined working distance from the object being viewed;
a secondary lens, said secondary lens being a biconvex lens disposed proximate said primary lens and centered with respect to said optical axis; and
a tertiary lens, said tertiary lens being a negative concave-convex lens disposed adjacent said secondary lens and centered with respect to said optical axis, said tertiary lens being disposed with respect to said primary lens such that said secondary lens is disposed therebetween, said lens focusing upon said object such that an image is formed at infinity.

10. The optical magnifying system according to claim 9 further comprising an eye relief distance from the optional filter to a viewer of from about 0 to about 24 inches.

11. The optical magnifying system according to claim 9 wherein said tertiary lens is a high dispersion glass lens and said primary and secondary lenses are low dispersion glass lenses.

12. The optical magnifying system of claim 9, wherein said system forms a high resolution image substantially over the entire field of view of the system.

13. The optical magnifying system according to claim 9 wherein said secondary and tertiary lenses form a doublet having one positive lens and the other, a negative lens.

14. The optical magnifying system according to claim 13 wherein said doublet is positioned with respect to said primary lens such that said positive lens is positioned proximate said primary lens.

15. The optical magnifying system according to claim 14 wherein a space having a predetermined length is formed between said primary and secondary lenses.

16. The optical magnifying system according to claim 9 wherein said system conforms substantially to the following table in which all elements have the characteristic values shown, proceeding from the object to the viewer:

| Element Number | Glass Type | Radius of Curvature Front/Back | Distance/ Thickness | Aperture Diameter Front/Back |
|---|---|---|---|---|
| (130) Working Distance | | | 1.9340 | |
| (112) Primary Lens | LAK21 Schott | −20.000CC/−2.1259CX | 0.7000 | 2.9000/3.0000 |
| (128) Space | | | 0.0200 | |
| (114) Secondary Lens | BAK1 Schott | 5.9541CX/−2.0567CX | 1.1000 | 3.1500/3.1500 |
| (116) Tertiary Lens | SF57 Schott | −2.0567CC/−4.7613CX | 0.1400 | 3.1500/3.1500 |
| (134) Aperture Stop Distance | | | 6.4000 to 16.000 | |
| (126) Aperture Stop | | | | 0.2000 |

NOTES
Positive radius indicates the center of curvature is to the right
Negative radius indicates the center of curvature is to the left
Dimensions are given in inches
Thickness is axial distance to next surface
REFERENCE WAVELENGTH = 589.0 NM SPECTRAL REGION = 486.0–656.0 NM

* * * * *